Patented Aug. 11, 1953

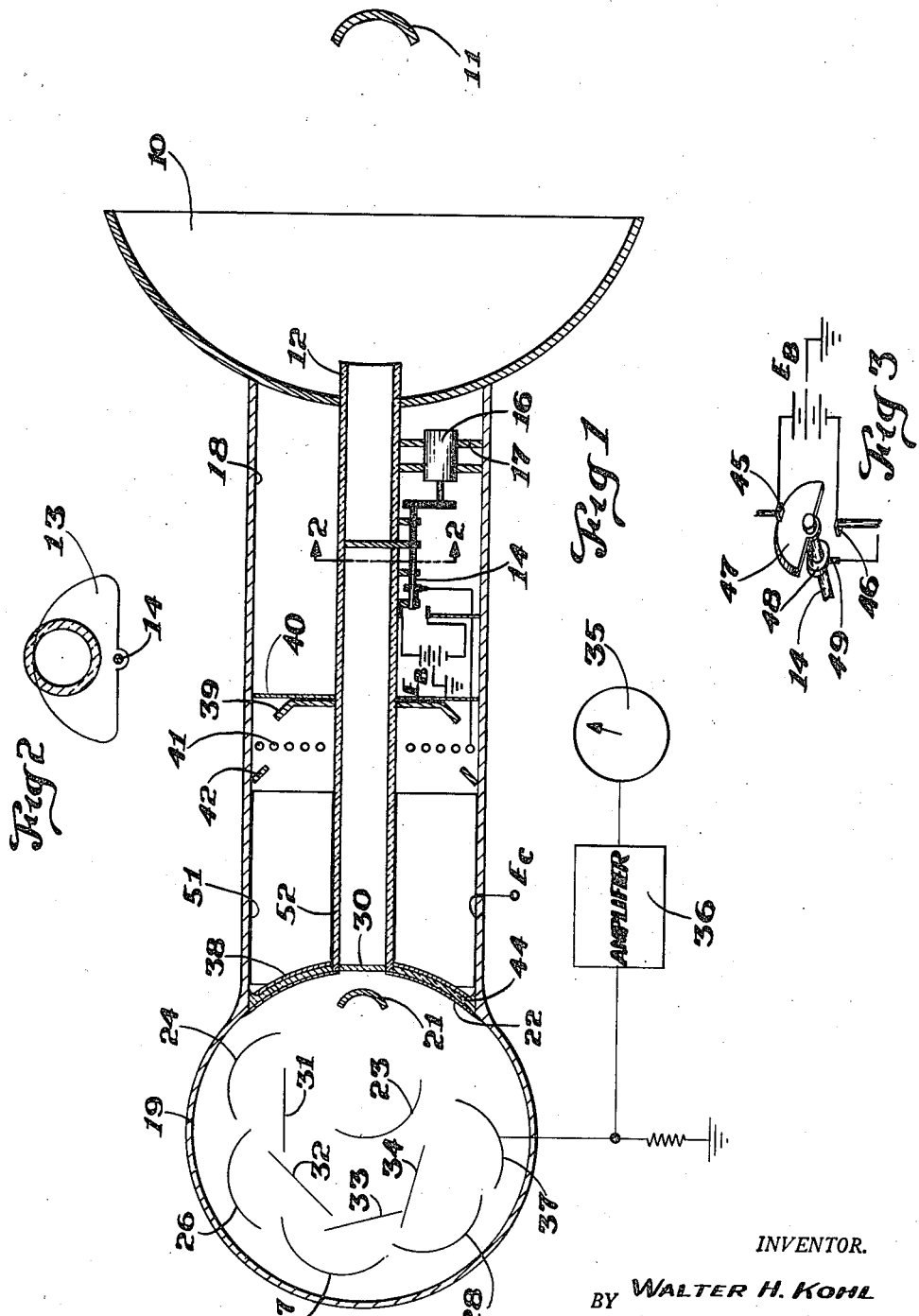

2,648,779

UNITED STATES PATENT OFFICE 2,648,779

RADIATION DETECTOR

Walter H. Kohl, Cedar Rapids, Iowa, assignor to Collins Radio Company, Cedar Rapids, Iowa, a corporation of Iowa Application April 7, 1951, Serial No. 219,790

10 Claims. (Cl. 250—83.3)

This invention relates in general to radiation detectors and in particular to means for receiving and detecting radiant energy in the infra-red region.

The spectrum has become more and more crowded by the increase in number of radio transmitters, television networks, and radar, and heretofore unused frequencies are being investigated to determine the feasibility of using them in communications and other systems. The infra-red region, which extends approximately from 0.7 to 1,000 microns in wave length, has been the subject of investigation and suitable transmitters have been developed for transmitting modulated energy in this frequency range. Various transmitters and detectors for infra-red radiation have been built and for a more detailed description of such apparatus, reference may be made to an article by G. J. Southworth appearing in the Journal of the Franklin Institute 1945, pages 239–285. It has been discovered that the atmosphere allows transmission of energy in the infra-red region only at distinct bands, referred to as "windows" in the art. Such windows exist, for example, at wave lengths of 0.8 to 1.3 microns, 1.5 to 1.7 microns, 2.0 to 2.3 microns, 3.4 to 4.5 microns, 8.0 to 13.0 microns, and 16.0 to 24.0 microns. Thus energy falling within the above ranges may be transmitted through the atmosphere.

It is an object of this invention, therefore, to provide an infra-red detector with a sensitivity great enough to detect and amplify incoming energy of a low level.

Another object of this invention is to provide an infra-red detector which allows the received infra-red radiation to excite an emitter whose output is greatly amplified, thus resulting in a final output proportional to the incoming infra-red signal.

Yet another object of this invention is to provide an infra-red detector in combination with a photo multiplier responsive to energy released by the incoming signal.

A feature of this invention is found in the provision for an infra-red detector comprising, an electron gun which periodically excites a phosphorescent substance which by its emisison excites a second phosphorescent substance whose energy is released by the impinging infra-red radiation. The output of the second phosphorescent substance is furnished to a photo multiplier to obtain an amplified output signal proportional to the incoming infra-red signal.

Further objects, features, and advantages of this invention will become apparent from the following description and claims when read in view of the drawings, in which:

Figure 1 is a sectional view of the infra-red detector of this invention;

Figure 2 is a sectional view taken on a line 2—2 of Figure 1; and,

Figure 3 is a detailed view of the switching mechanism of this invention.

Figure 1 illustrates a reflector 10 which receives energy in the infra-red region and reflects it to a focal point where a curved mirror 11 is supported. The mirror 11 reflects the infra-red radiation back through an opening formed in the center of the reflector 10 and through a tube 12 which might be made of glass.

The tube 12 is formed with a slot intermediate its ends and as best shown in Figure 2 a template 13 is pivotally supported on a shaft 14 to which is connected a driving means 16. The template fits into the slot in tube 12 as the shaft 14 rotates. The driving means 16 is mounted by stand-offs 17 to the outer wall of tube 12 and the inner wall of a concentric tube 18 formed about the tube 12. The driving means 16 which might be, for example, a constant speed electric motor, drives the template 13 so as to interrupt the passage of infra-red energy down the tube 12 a portion of a cycle and to allow it to pass the remainder of the cycle.

The infra-red energy which is uninterrupted by the plate 13 passes down the tube 12 and emerges into a spherical shell 19 which is connected to the ends of tubes 12 and 18. An arcuate reflector 21 receives the incoming infra-red radiation and reflects it upon areas 22 of the spherical shell 19 that are sensitive to infra-red radiation and which give an emission upon the reception thereof. The material 22 is an infra-red sensitive phosphor which is periodically excited in a manner to be subsequently described and gives an output emission proportional to the intensity of the received infra-red signal.

The emission from the material 22 is intercepted by a photo-cathode 23 which emits electrons that impinge on a series of dynodes 24, 26, 27 and 28 and in cooperation with field shaping electrodes 31, 32, 33 and 34 form a multiplier. A collector electrode 37 receives the output of dynode 28 and furnishes an output to a detecting means comprising an amplifier 36 and a meter 35. Suitable voltages are connected to the electrodes to obtain the well known multiplier effect.

The material 22 that gives an emission when infra-red energy impinges thereon must be periodically excited and for this purpose a second coating of emissive material 38 is placed on the opposite side of the shell 19 adjacent material 22. An electron gun comprising a cathode 39, a grid 41, and a focusing electrode 42 fits concentric about tube 12 within tube 18 and periodically bombards the material 38 with an electron stream. This excites the material 38 resulting in emission therefrom which passes through the shell 19 to excite the material 22. The grid 41 of the electron gun is timed with the template 13 so that the electron gun bombards the material 38 at a time when the template 13 prevents the passage of infra-red through the tube 12 and turns off the electron gun when infra-red passes through the tube 12.

Means for controlling the flow of electrons from the electron gun to the material 38 comprise a biasing voltage $E_B$ which has its positive side connected to an upper wiper contact 45 and its negative side connected to a lower wiper contact 46. The contacts 45 and 46 are mounted to the tubes 12 and 18, respectively, by standoffs. Battery $E_B$ has its mid-point grounded.

A template 47 is mounted on the shaft 14 and engages wiper contacts 45 and 46. The template 47 is of the same general shape as the template 13 but is much smaller so that it turns within the space between tube 12 and tube 18. A slip ring 48 is mounted on the shaft 14 adjacent the template 47 and is electrically connected to it.

A brush 49 contacts the slip ring 48 and is electrically connected to the grid 41. The driving means 16 thus periodically changes the polarity of the grid 41 to turn the electron gun on or off. The wiper contact 45 engages the template 47 when the template 13 is intercepting the infra-red radiation within the tube 12, and thus the electron gun conducts when the wiper contact 45 engages template 47. When wiper contact 46 engages the template 47 a negative voltage is supplied to the grid 41 and the electron gun is turned off. A pair of cylinders 51 and 52 are mounted between the material 38 and the grid 41 and a positive voltage $E_c$ is applied thereto to accelerate the electrons toward the material 38. The cylinders 51 and 52 are made of conducting material as, for example, copper.

The shell 19 and tube 18 are made from material treated so as not to transmit light. The inner ends of tubes 12 and 18 are joined by glass 44 and it is upon either side of this surface that the materials 22 and 38 are deposited.

Across the inner end of tube 12 is mounted a glass cover 30 to maintain the inside of cylinder 19 at a vacuum. An annular member 40 of glass, for example, is mounted between tubes 12 and 18 rearwardly of the cathode 39 to allow the electron gun to operate in a vacuum chamber.

It has been known for some time that certain phosphors may be excited by the absorption of radiation and then have the energy liberated by infra-red radiation. Thus when a phosphor has been excited by short wave radiation it will give off a visible emission when struck by infrared radiation. It is to be realized, of course, that the exciting frequency and the frequency of the energy released may be varied by choosing different phosphors.

For example, X-rays, $\alpha$-particles, electron bombardment or corpuscular radiation may be used to excite the source. In the apparatus of Figure 1 electron bombardment is illustrated. It is to be understood that the invention relates to bombardment by other forms of energy as well.

The exciting energy, for example, might be a radioactive material which excites the material 38 with its radioactive emission. The phosphor 38, upon being excited by the electron beam, is of such a nature to give off ultraviolet radiation of short duration.

Many phosphor materials are produced by combining a very small amount of a material with a larger amount of another material. The small amount of material is termed the activator and in some way causes the mixture to become phosphorescent. For example, if zinc cadmium sulfide is mixed with a small amount of silver as, for example, 1 part in 100,000, the mixture is phosphorescent. In some cases a material must have two activators to make it phosphorescent. An example of this is the alkaline-earth sulfides which require a dominant and an auxiliary activator wherein the dominant activator causes the material to become phosphorescent and the auxiliary activator controls the stimulation spectrum of the mixture. With the alkaline-earth sulfides, europium and cerium are important dominant activators and samarium or emporium may be used as the auxiliary activators. Examples of such known phosphors are: Zinc/cadmium sulfide with silver as an activator, calcium phosphate with cerium as an activator, and calcium tungstate.

The adjacent phosphor 22 is excited by the ultraviolet radiation given off by the first phosphor 38 and retains its energy until stimulated by the incoming infra-red radiation. The infra-red radiation causes the phosphor 22 to emit energy to stimulate the photo-multiplier. The photo-multiplier must be sensitive to the emission given off by the phosphor 22 and insensitive to emission from the phosphor 38. Examples of infra-red sensitive phosphors which respond to stimulation are the alkalihalides which require excitation by $\alpha$-particles from a radiation source. Another example is the alkaline-earth sulfides which have at least two activators, the dominant activator and the auxiliary activator. They show pronounced stimulability where the stimulation spectrum is determined by the auxiliary activator. Standard VII, for example, developed during World War II contains cerium and samarium and is excited by ultraviolet light with excitation peaks at 0.29 micron and 0.35 micron. Its emission has a maximum at 0.485 micron and a stimulation maximum at 1.02 microns. This phosphor emits one visible light quantum for every 100 incident infra-red quanta. To use Standard VII would require that the first phosphor 38 have an emission band from 0.29 to 0.35 micron and that the photocathode respond to 0.485 micron. The photo-cathode might be of the S-9 type (RCA 5819) which responds at this wave length.

A suitable material for the first phosphor would be calcium tungstate ($CaWO_4$) or zinc cadmium sulfide with silver as an activator (ZnCdS[Ag]).

For optimum operation of the device certain frequency relations must be observed, depending upon the materials chosen for the phosphors 22 and 28. If the modulation frequency of the infra-red shutter be designated as $f_1$ and the modulation frequency of the electron beam as $f_2$, $f_1$ should equal $f_2$ but they should be 90 degrees out of phase with respect to each other so that the electron beam is stimulating the phosphors 38 when the shutter 13 is intercepting the infra-red radiation. If $t_3$ is the period of afterglow for the phosphor 38, then the period $t_1$ corresponding to the frequency $f_1$ must be less than $t_3$. If $t_4$ is the period for objectionable primary excitation shown by the phosphors 22, then $t_3$ must be less than $t_4$.

This results in the inequality of $$f_1 = f_2 < f_3 < f_4$$

To the period of primary excitation luminescence and afterglow $t_4$ is to be added the period $t_5$ required for stimulation of emission so that, more completely, $$f_1 = f_2 < f_3 < (f_4 + f_5)$$

This equation describes the frequency relationships, and the phase relationships must be such that a new impulse of infra-red radiation reaches phosphor 22 after its stimulation from the previous infra-red pulse has spent itself.

The preparation of phosphors is a highly developed art, but the reasons for the phenomenon are not completely understood. The properties of phosphors, however, can be changed at will by careful control of their composition and treatment.

It is seen that this invention provides means for receiving and detecting an infra-red signal by changing the infra-red radiation to photo emissive radiation and multiplying this radiation to a high amplitude. If the received infra-red energy is amplitude modulated, the modulation will occur in the output of amplifier 36. Intelligence may thus be transmitted through the atmosphere.

Although the invention has been described with respect to a preferred embodiment thereof, it is not to be so limited as changes and modifications may be made therein which are within the full intended scope of the invention as defined by the appended claims. In particular, it should be understood that the mechanical shutter mechanism described above for modulation of the incoming infra-red radiation can be replaced by electrical or optical means known in the art.

I claim:

1. An infra-red detector comprising, a tube, a first reflector mounted to one end of said tube and adapted to reflect infra-red radiation down said tube, a second reflector at the opposite end of said tube, a first phosphor material intercepting the energy from said second reflector, a second phosphor material adjacent said first phosphor material, an exciting means exciting said second phosphor to cause it to give an emission which excites said first phosphor material, means for intercepting the infra-red energy flowing through the first tube, timing means for controlling the exciting means to turn it on when no infra-red radiation is passing through said tube, and multiplying means receiving the output of said first phosphor material, and detecting means connected to said multiplying means to produce an output proportional to the output of said first phosphor.

2. Means for detecting infra-red energy comprising, a tube, a first reflector mounted about said tube, a second reflector mounted forwardly of said first reflector and adapted to reflect the received infra-red energy through said tube, a first phosphor material deposited on a supporting means adjacent the opposite end of said tube, a second phosphor material supported adjacent said first phosphor material, detecting means sensitive to the emission given off by said first phosphor material, and said first phosphor material activated by emission given off by said second phosphor material.

3. An infra-red detector comprising, receiving means intercepting infra-red energy, a tube receiving the infra-red energy from said receiving means, a first phosphor material receiving the infra-red energy passing through said tube, a second phosphor material supported adjacent said first phosphor material, activating means periodically stimulating said second phosphor material to cause it to give an emission which stimulates said first phosphor material, a photomultiplier receiving energy from said first phosphor material when the infra-red radiation impinges on the first phosphor material, and indicating means receiving the output of the multiplying means to produce an output proportional to the intensity of the received infra-red radiation.

4. Means for receiving infra-red radiation and detecting modulation thereon comprising, a concentrating reflecting system receiving said infra-red radiation, a tube receiving the reflected energy from said reflecting system, intercepting means within said tube periodically intercepting infra-red radiation passing through said tube, a first phosphor material placed adjacent the opposite end of said tube so as to receive the infra-red radiation passing through the tube, a second phosphor material supported adjacent the first phosphor material, activating means for the second phosphor material timed with the intercepting means so as to activate the second phosphor material at a time when the intercepting means is preventing infra-red radiation from passing through the tube, said second phosphor material giving an emission in response to activation by the activating means which excites the first phosphor material, said first phosphor material producing an output in response to the reception of the infra-red radiation, and detecting means receiving the output of the first phosphor material to produce an output proportional to the amplitude of the received infra-red energy.

5. Means for detecting and de-modulating infra-red energy comprising, a tube receiving the infra-red radiation therein, intercepting means within said tube periodically intercepting the flow of the infra-red energy through the tube, a first phosphor material adjacent the opposite end of the tube and receiving the infra-red energy passing through the tube, a second phosphor material adjacent the first phosphor material, exciting means exciting the second phosphor and timed with the intercepting means so that the second phosphor is activated at a time when the infra-red energy is being intercepted within the tube, said second phosphor producing an emission which activates the first phosphor so that it will give up energy upon the reception of the infra-red radiation, and detecting means receiving the energy given off by the first phosphor and producing an output which is proportional to the amplitude of the infra-red radiation.

6. Means for producing an output proportional to the amplitude of received infra-red energy comprising, a first reflector receiving the infra-red energy, a second reflector receiving the reflected infra-red energy from the first reflector, a tube spaced so as to receive infra-red radiation from the second reflector, an intercepting means within said tube, a driving means driving said intercepting means so that it periodically intercepts the radiation passing through said tube, a first phosphor material mounted adjacent the opposite end of said tube and receiving the infra-red radiation thereon, a second phosphor material adjacent said phosphor material, an exciting means adjacent said second phosphor material, timing means synchronized with said intercepting means and controlling said exciting means to turn it on when the infra-red energy is being intercepted in the tube and to turn it off when the infra-red energy is passing through the tube, said second phosphor material excited by the exciting means and producing an emission which excites the first phosphor material, said first phosphor material producing an emission upon the reception of infra-red energy, multiplying means receiving the emission from said first phosphor material to multiply it, and detecting means receiving the output of the multiplying means to obtain an output proportional to the amplitude of the received infra-red radiation.

7. Infra-red detecting means comprising, a reflecting system receiving the infra-red radiation, a tube mounted so as to receive energy from said reflecting system, a transverse slot formed in said tube, a template received within said slot, said template mounted on a shaft, said shaft rotatably supported adjacent said tube, a driving means connected to said shaft, a second reflecting means at the opposite end of said tube, a first phosphor material deposited adjacent the end of the tube and receiving the infra-red radiation from the second reflector, a second phosphor material adjacent the first phosphor material, multiplying and detecting means sensitive to the emission from the first phosphor material receiving said emission and producing an output proportional to the amplitude of the received infra-red energy, exciting means producing an electron stream which impinges on said second phosphor material, biasing means controlling said exciting means and timed with said template so that the second phosphor material is excited at a time when no infra-red energy is passing through the tube, and said second phosphor material producing an emission which activates the first phosphor material.

8. Means for detecting infra-red energy comprising, first reflecting means receiving infra-red radiation, second reflecting means receiving the infra-red radiation from said first reflector means, a tube receiving the infra-red radiation from said second reflecting means, a slot formed transversely of said tube, a semi-circular template mounted on a shaft, said shaft rotatably supported adjacent the tube, said template received through said slot to periodically intercept the infra-red radiation, a driving means connected to said shaft, third reflecting means receiving the infra-red radiation which passes through the tube, a first phosphor material deposited adjacent the end of said tube, said third reflecting means reflecting the infra-red radiation on said first phosphor material, a second phosphor material deposited adjacent the first phosphor material, an electron gun focused on the second phosphor material, biasing means for the electron gun, a second semi-circular template mounted on said shaft, a pair of brushes supported adjacent said template and connected to the biasing means to periodically turn the electron gun on and off, detecting means receiving an output from the first phosphor material, said second phosphor material giving an emission which stimulates the first phosphor material upon the receipt of electron bombardment, and the first phosphor material giving off a photo-emission upon the reception of infra-red radiation.

9. In apparatus according to claim 8 wherein said detecting means comprises a photo multiplier which multiplies and amplifies the output from said first phosphor.

10. In apparatus according to claim 8 wherein a light impervious shielding means surrounds the tube, the first and second phosphor materials, and the detecting means to prevent stray energies from actuating the detecting means.

WALTER H. KOHL.

References Cited in the file of this patent

UNITED STATES PATENTS

| Number | Name | Date |
| --- | --- | --- |
| 2,395,099 | Cage | Feb. 19, 1946 |
| 2,457,747 | Sweet | Dec. 28, 1948 |